C. G. CRISPIN.
LIGHT WEIGHT PISTON OF SKELETON CONSTRUCTION.
APPLICATION FILED AUG. 11, 1920.

1,387,593. Patented Aug. 16, 1921.

Clarence G. Crispin
INVENTOR

BY
Kerr, Page, Cooper & Hayward
ATTORNEYS

UNITED STATES PATENT OFFICE.

CLARENCE G. CRISPIN, OF EAST BERWICK, PENNSYLVANIA.

LIGHT-WEIGHT PISTON OF SKELETON CONSTRUCTION.

1,387,593.     Specification of Letters Patent.     Patented Aug. 16, 1921.

Application filed August 11, 1920. Serial No. 402,833.

*To all whom it may concern:*

Be it known that I, CLARENCE G. CRISPIN, being a citizen of the United States, residing at East Berwick, in the county of Luzerne and State of Pennsylvania, have invented certain new and useful Improvements in Light-Weight Pistons of Skeleton Construction, of which the following is a full, clear and exact description.

The object of this invention is primarily to provide a piston that may be manufactured cheaply and in favorable comparison of costs as against the common trunk type of piston used in most automobile gasolene engines, and to provide a piston that may be made on molding machines with green sand cores thus making a very low molding cost, and to further provide a piston that will be as readily and cheaply machined as the standard piston. In addition to being able to manufacture this piston at least as cheaply as any piston now made, it is the further purpose of this invention to furnish a design that will effect a saving in the use of gasolene and oil and that at the same time will be a durable piston and a practical one and one that will stand the heat and strains better than the common trunk type of pistons now in use.

Other objects of the invention reside in the provision of a piston which is light in weight and which, by its construction, provides for a free circulation of air to cool the piston and the cylinder walls.

Another object resides in the provision of certain novel lubrication features which efficiently and amply lubricate the wrist pin and the cylinder walls and also provide for the draining back of excessive oil to the engine crank case thereby preventing excessive use of oil.

Other objects and advantages will be pointed out in detail in the accompanying specification, drawing and claims.

Figure 1:
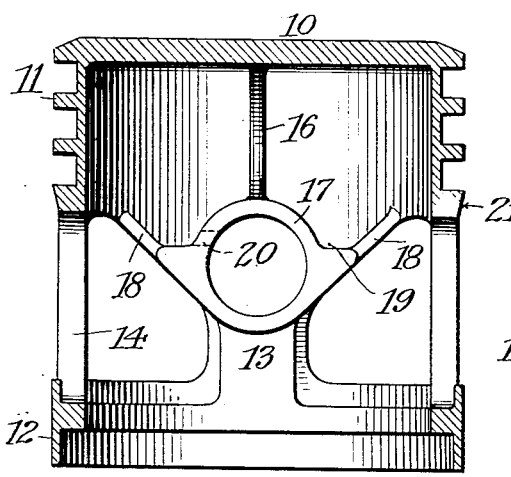
Figure 1 shows a view in section of my improved piston, the section being taken along the line 1—1 of Fig. 2 looking in the direction of the arrows.
Figure 2:
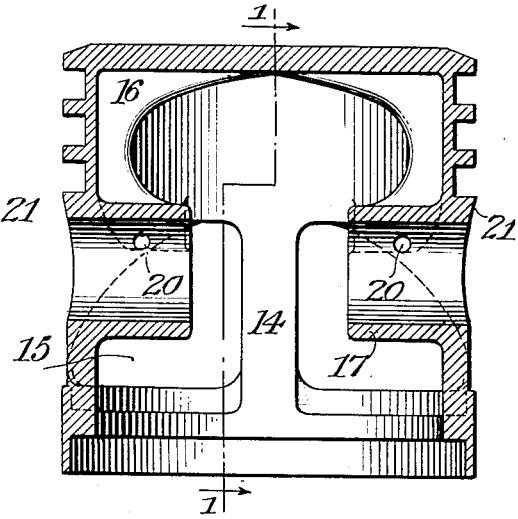
Fig. 2 represents a view in section taken longitudinally through the center of the piston on a plane at right angles to Fig. 1.

Referring more particularly to the drawings, the piston is of the well known trunk type and comprises a body portion including an upper head 10, an integral upper ring portion 11 suitably grooved to receive the piston rings, a lower skirt portion 12, and connecting or bridging portions 13 and 14. These bridging portions are so formed that a number of large openings 15 are formed in the wall of the piston. The head of the piston is preferably reinforced with webs 16. 17 designates the wrist pin bosses which are integral with the connecting portions 13 and are provided with webs or wings 18 which not only reinforce the piston pin bosses but also with the bosses form cups or pockets 19 wherein oil will lie almost constantly and feed itself through oil holes 20 to the wrist pin.

The lower surface of the wrist pin bosses 17 and the webs 18 are at an angle to the vertical and these surfaces have a further and most important function of deflecting the oil that is splashed into the piston from the crank case out through the apertures 15 against the cylinder walls. In this manner ample lubrication is secured permitting the use of tighter piston rings with the resultant reduction in leakage of gas past the piston rings and a consequent saving of gasolene.

The saving of oil is effected by means of a recession or bevel 21 upon the lower part of the upper ring carrying portion. With this arrangement on the down stroke the lower piston rings scrapes back the excess oil on the cylinder walls which oil then drops back through the openings 15 into the crank case. Furthermore, the splashing of the oil against the wall close to the piston rings, where it is most needed, requires less oil than would otherwise be the case.

Figure 4:
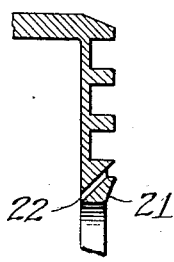
Figs. 4 and 5 show modified means of draining back excess oil from the cylinder walls.
Figure 5:
Figure 6:
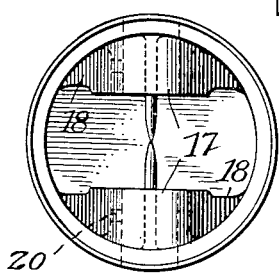
Fig. 6 is an end view of the piston shown in section in Figs. 1 and 2.

Figs. 4 and 5 show modified forms of oil releasing means. In Fig. 4 I provide an oil duct 22 which extends into the cut away groove and drains back excessive oil therefrom. In Fig. 5 a similar groove is provided but the recession or bevel is omitted.

Figure 3:
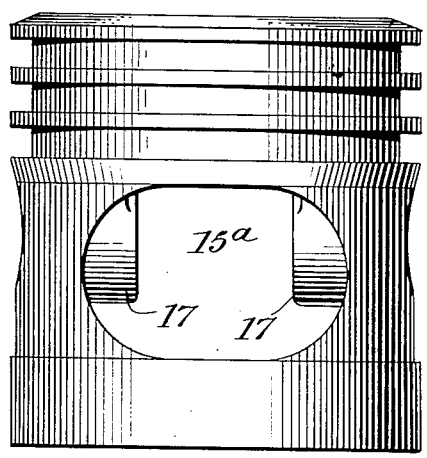
Fig. 3 shows in side elevation a modification form of piston with the bridging portions 14 omitted.

Fig. 3 shows a piston with a single pair of openings 15ª in the cylinder wall. In other respects the piston is the same as the form heretofore described.

The piston heretofore described is particularly adapted to provide for a free circulation of air in and around the wrist pin bosses and against the cylinder wall. In this way cooling of the parts is materially aided. The lubricating features effect a considerable saving of oil and decrease carbonization and at the same time provide ample lubrication for all parts requiring oil.

The cut away walls materially reduce the weight of the piston and thereby cut down the inertia and attendant vibration of the piston when in use.

The above desirable features are moreover secured in a piston which is cast in one integral casting thereby securing strength and cheapening the cost of the same.

What I claim is:

1. In a piston, the combination of a body portion having openings in the walls thereof, and wrist pin bosses having lower substantially flat and extended surfaces disposed at an angle to the vertical for deflecting lubricating oil splashed from below laterally through the said openings onto the walls of the cylinder.

2. In a piston the combination of a body portion of integral wrist pin bosses therein, said bosses having reinforcing webs extending upwardly from the sides of the bosses and coacting with the bosses to form oil entrapping pockets therebetween, and oil ducts leading from said pockets to the wrist pin to conduct the entrapped oil thereto.

3. In a piston comprising a head, an upper ring portion, a lower skirt portion, connections connecting the upper ring portion and the skirt portion and defining wall openings, wrist pin bosses integral with one pair of the said connections, webs connecting the said bosses with the side of the ring portion and the head of the piston, certain of said webs and a portion of said wrist pin bosses having such configuration as to deflect splashed oil through the wall openings onto the sides of the cylinder and certain of said webs and certain portions of said bosses forming oil cups which entrap oil and lubricate the wrist pins.

4. In a piston, the combination of a body portion having openings in the walls thereof, wrist pin bosses and integral reinforcing webs connecting the same with the walls of the body portion, said webs joining said bosses at the sides thereof and thereby forming with the surfaces of the bosses, continuous surfaces disposed at an angle to the vertical and adapted to deflect upwardly splashed oil laterally through the openings onto the cylinder walls.

In testimony whereof I hereto affix my signature.

CLARENCE G. CRISPIN.